(12) United States Patent
LePort

(10) Patent No.: US 8,313,850 B1
(45) Date of Patent: Nov. 20, 2012

(54) METHOD FOR DETECTING BATTERY THERMAL EVENTS VIA BATTERY PACK PRESSURE MONITORING

(75) Inventor: Francisco Richard LePort, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/434,664

(22) Filed: Mar. 29, 2012

Related U.S. Application Data

(63) Continuation of application No. 13/434,441, filed on Mar. 29, 2012.

(51) Int. Cl.
*H01M 10/44* (2006.01)
(52) U.S. Cl. .................................... 429/50; 429/61
(58) Field of Classification Search ............ 429/50
See application file for complete search history.

(56) References Cited

FOREIGN PATENT DOCUMENTS
JP    2011-009042    *   1/2011

* cited by examiner

*Primary Examiner* — Ula C Ruddock
*Assistant Examiner* — Jacob Marks
(74) *Attorney, Agent, or Firm* — Patent Law Office of David G. Beck

(57) ABSTRACT

A method for detecting and responding to a battery thermal event within a sealed battery pack is provided. The method includes the steps of monitoring and characterizing the pressure within the battery pack over time, where identifying a battery thermal event is based on the pressure data fitting a specific curve shape, and performing a preset response when a battery thermal event is identified. The method may additionally monitor for a secondary effect associated with the battery thermal event.

17 Claims, 5 Drawing Sheets

METHOD FOR DETECTING BATTERY THERMAL EVENTS VIA BATTERY PACK PRESSURE MONITORING

CROSS-REFERENCE TO RELATED APPLICATION

This application is a continuation of U.S. patent application Ser. No. 13/434,441, filed 29 Mar. 2012, the disclosure of which is incorporated herein by reference for any and all purposes.

FIELD OF THE INVENTION

The present invention relates generally to batteries and battery packs and, more particularly, to a system and method for detecting thermal events within a battery pack.

BACKGROUND OF THE INVENTION

Batteries come in a wide variety of types, chemistries and configurations, each of which has its own merits and weaknesses. Among rechargeable batteries, also referred to as secondary batteries, one of the primary disadvantages is their relative instability, often resulting in these cells requiring special handling during fabrication, storage and use. Additionally, some cell chemistries, for example lithium-ion secondary cells, tend to be more prone to thermal runaway than other primary and secondary cell chemistries.

Thermal runaway occurs when the internal reaction rate of a battery increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During the initial stages of a thermal runaway event, the cell undergoing runaway becomes increasingly hot due to the increased reaction rate and the inability of the system to withdraw the heat at a rapid enough rate. As the temperature within the cell increases, so does the pressure, leading to the eventual release of at least some of the gas generated by the reaction via the safety pressure release vent that is common to most cells. After a short period of time, the increased temperature in concert with the increased internal cell pressure leads to the formation of perforations in the cell casing. Once the cell casing is perforated, the elevated internal cell pressure will cause additional hot gas to be directed to this location, further compromising the cell at this and adjoining locations.

While the increase in cell temperature during a thermal runaway event is sufficient to damage materials in proximity to the event and to lead to the propagation of the event to adjoining cells, it is not until the hot gas escapes the confines of the cell, and potentially the confines of the battery pack, that the risk to people and property damage is significant. This is because while the event is confined, the gas generated by the event is primarily composed of carbon dioxide and hydrocarbon vapors. As a result, the autoignition temperature (AIT) of combustible materials in proximity to the event is relatively high. However, once this gas exits the confines of the cell/battery pack and comes into contact with the oxygen contained in the ambient atmosphere, the AIT of these same materials will decrease significantly, potentially leading to their spontaneous combustion. It is at this point in the event cycle that extensive collateral property damage is likely to occur and, more importantly, that the risks to the vehicle's passengers leaving the vehicle, or to first responders attempting to control the event, becomes quite significant.

Accordingly, it is desirable to detect thermal runaway events as quickly as possible, preferably before an individual thermal runaway event can propagate to other cells within the battery pack, thereby providing time to minimize property damage as well as the risk to people in relatively close proximity to the battery pack. The present invention provides a method and system for the early detection of such events.

SUMMARY OF THE INVENTION

The present invention provides a method for detecting and responding to a battery thermal event within a sealed battery pack. The method is comprised of the steps of (i) continuously monitoring the pressure within the battery pack and compiling the pressure into a plurality of sequential pressure data sets; (ii) detecting a pressure anomaly within one of the sequential pressure data sets; (iii) identifying a pressure peak within the pressure data set that includes the pressure anomaly; (iv) fitting a curve to the trailing edge of the pressure data set that includes the pressure anomaly; (v) determining if the curve corresponds to an exponential decay curve, wherein if the curve corresponds to an exponential decay curve the method further includes the step of (vi) determining if a time constant corresponding to the exponential decay curve is within a preset range of time constants, wherein if the time constant corresponding to the exponential decay curve is within the preset range of time constants the method further includes the step of (vii) performing a predetermined battery thermal event response.

In at least one embodiment, the pressure peak corresponding to the pressure anomaly exhibits an amplitude of at least 0.1 psi.

In at least one embodiment, the method may further include the steps of setting a minimum time constant for the preset range of time constants to 8 seconds and setting a maximum time constant for the preset range of time constants to 13 seconds.

In at least one embodiment, the method may further include the steps of determining a goodness of fit between the exponential decay curve and the pressure data and only performing the predetermined battery thermal event response if the curve corresponds to an exponential decay curve and the time constant corresponding to the exponential decay curve is within the preset range of time constants and a value corresponding to the goodness of fit is within a preset range of values.

The method may further comprise the step of monitoring for a secondary effect associated with the battery thermal event, where the predetermined cell failure response is performed after it is determined that the curve corresponds to an exponential decay curve and the time constant corresponding to the exponential decay curve is within the preset range of time constants and after the secondary effect is detected. The step of monitoring for a secondary effect may further comprise the step of (i) monitoring for a loss of voltage chain continuity; (ii) monitoring the battery pack temperature where the secondary effect corresponds to a battery pack temperature that exceeds a preset temperature; (iii) monitoring the battery pack humidity where the secondary effect corresponds to a battery pack humidity that exceeds a preset humidity; and (iv) monitoring the coolant temperature of a battery pack cooling system where the secondary effect corresponds to a coolant temperature that exceeds a preset temperature.

The step of performing a predetermined battery thermal event response may further comprise the step of (i) activating a visual warning indicator; (ii) activating an audible warning indicator; (iii) reducing or minimizing an electrical load applied to the battery pack; (iv) increasing the cooling applied to the battery pack by a battery pack cooling system; (v) activating a fire containment system; (vi) recording date and time information corresponding to when the electrical isolation resistance fell below the preset resistance value; and/or (vii) transmitting a notification message via a communication and notification subsystem.

A further understanding of the nature and advantages of the present invention may be realized by reference to the remaining portions of the specification and the drawings.

DESCRIPTION OF THE SPECIFIC EMBODIMENTS

Figure 1:
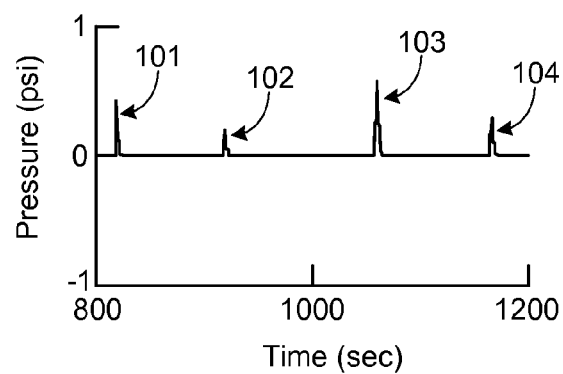
FIG. 1 provides test results for a battery pack in which multiple cells were driven into thermal runaway.

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all-electric vehicle, also referred to as an EV, or a hybrid (HEV)/plug-in hybrid (PHEV) vehicle, where hybrid vehicles utilize multiple propulsion sources one of which is an electric drive system.

As previously noted, during the initial stages of thermal runaway cell temperature and internal pressure increase until the cell's safety pressure release vent opens. Once the safety vent opens, a variety of factors determine whether or not the cell's temperature and pressure will continue to increase, and whether or not the thermal runaway event may propagate to adjacent cells. Factors that may influence the progression of the thermal event include proximity of the affected cell to other cells or materials, whether or not the cause of the cell undergoing thermal runaway has been alleviated, whether or not the cell is still under load, ambient temperature as well as the temperature within the battery pack, and the current efficiency of the thermal management system to remove heat from the affected cell and the surrounding environment. It will be appreciated that as many of these factors may be easily controlled, thereby potentially preventing propagation of a thermal event throughout a pack, it is imperative to detect thermal runaway events as quickly as possible.

While it is clearly desirable to quickly detect a cell undergoing the first stages of thermal runaway and then manage the event before it can propagate throughout the battery pack, thermal event detection is quite difficult, often complicated by the occurrence of non-related events that may cause false positives. For example, while monitoring the pressure within a battery pack may be used to detect thermal runaway events as soon as a cell's safety pressure release vent opens, fluctuations in pressure may also result from a variety of other events such as changes in altitude or in the weather. Even mechanical vibration of the battery pack or electrical noise within the system may cause the occurrence of false positives. Given that the response to a detected thermal event may be quite drastic, for example disconnecting the battery pack from the motor and/or other vehicle electrical systems, flooding the battery pack with fire retardant, activating alarms, etc., it is important that any system that is used to detect thermal runaway within a battery pack is able to distinguish between actual runaway events and false positives.

FIG. 1 illustrates a test where the cells within a sealed battery pack were subjected to conditions that resulted in the cells, one-by-one, entering into thermal runaway. In the illustrated test four cells, represented by curves 101-104, entered into thermal runaway within 13 to 20 minutes of test initiation. Due to minor variations in the cells, the pressure increase accompanying each cell's thermal runaway ranged from a low of approximately 0.2 psi (curve 102) to more than 0.6 psi (curve 103). Eventually, after a little more than 20 minutes, the event began to propagate throughout the pack (not shown). As used herein and throughout this specification, a "sealed" battery pack refers to a battery pack that is fabricated from substantially impermeable materials (e.g., aluminum, steel, etc.) and in which the battery pack seals insure minimal leakage, thus providing a pack in which the pressure decay time constant is more than a few seconds. Note that the battery pack used for this test included a pressure relief valve with a cracking pressure of 0.25 psi.

While the simple occurrence of an elevated pressure reading within a sealed battery pack is not sufficient to clearly and unambiguously identify the cause as being a cell undergoing thermal runaway, the present inventor has found that it is possible to monitor battery pack pressure and analyze the resultant data in such a way as to significantly reduce, if not altogether eliminate, the risk of false positives.

Figure 2:
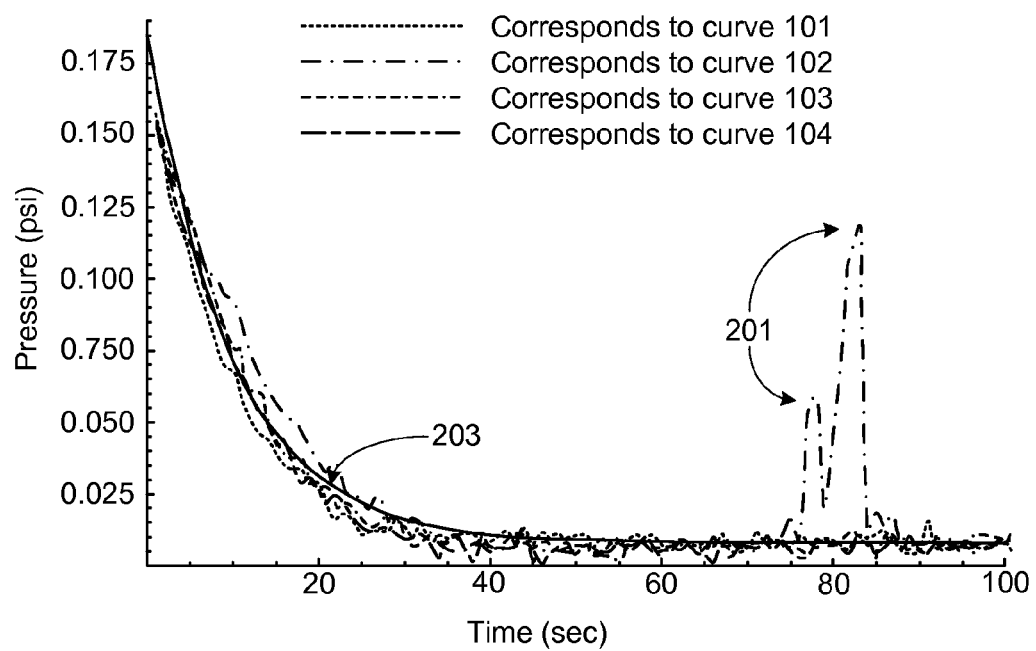
FIG. 2 expands and overlays the trailing edge of each of the thermal runaway events shown in FIG. 1.

FIG. 2 graphically illustrates the trailing edge of curves 101-104 overlaid on top of one another. The illustrated data is taken from a pressure of approximately 0.175 psi down to the nominal background pressure. Note that the spikes at 201 were not in the original pressure data, but were artificially added to curve 102 to illustrate the differences between a noise spike and the pressure curve corresponding to a cell undergoing thermal runaway. Curve 203, represented by a solid line in FIG. 2, corresponds to an exponential decay curve in which the time constant has been set to 9.7 seconds.

Figure 3:
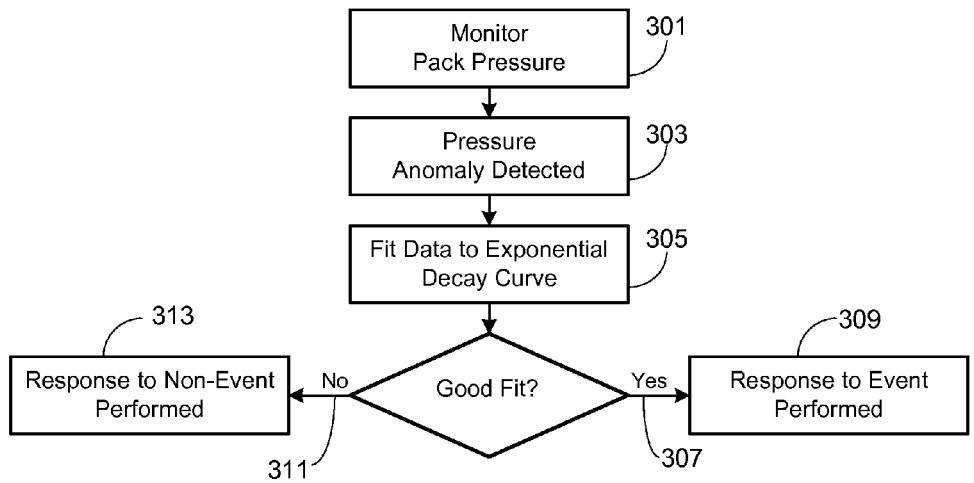
FIG. 3 illustrates the basic methodology of the thermal event detection system in accordance with the present invention.

FIG. 3 illustrates the basic steps of a thermal event detection system in accordance with the invention. In this process, the internal pressure of a battery pack is continuously monitored using one or more pressure monitors (step 301). When a potential thermal event is detected (step 303), the system controller distinguishes between pressure data that may be due to gradual changes in the detected pressure (e.g., due to altitude and/or weather changes) and those due to cell venting as a result of a thermal event. Similarly, the system controller distinguishes between actual thermal events and rapid transients in the data, for example due to signal noise within the detection system. In general, the system controller is able to distinguish between these various phenomena by a process of curve fitting, specifically fitting the trailing edge of the pressure data to an exponential decay curve (step 305). If the pressure data can be fit to an exponential decay curve with an acceptable time constant (step 307), then a preset response to the event is performed (step 309). If the pressure data cannot be fit to the exponential decay curve with an acceptable time constant (step 311), then the system controller performs a preset response to the non-event (step 313).

Figure 4:
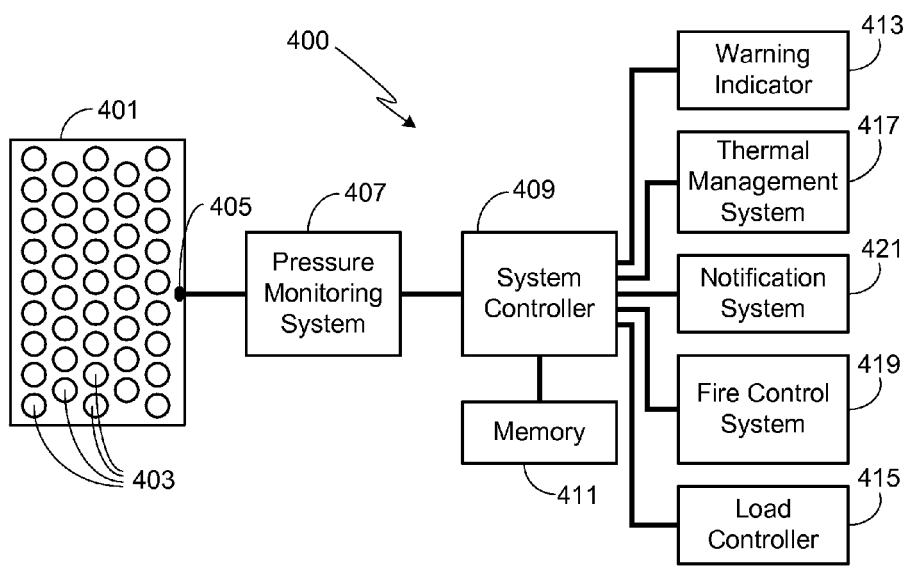
FIG. 4 illustrates the basic elements of a system used to detect thermal events in accordance with the present invention.

FIG. 4 illustrates the basic elements of a system 400 that is designed to detect cell thermal events within the battery pack by monitoring and analyzing variations in battery pack internal pressure. After event detection and confirmation, system 400 is configured to perform one or more functions in response to the detected thermal event. As shown, sealed battery pack 401 includes a plurality of cells 403 along with one or more pressure monitors 405. Pressure sensor(s) 405 is coupled to a system 407 that monitors battery pack pressure. System 407 must be capable of determining battery pack pressure with sufficient frequency to allow an accurate characterization of the changing battery pack pressure as the pressure release vent of an individual cell opens during thermal runaway. As such, the acquisition rate of system 407 must be much faster, at least 10 times faster, than the pressure decay time constant of the pack. Battery pack 401 includes at least one, and typically hundreds or thousands of rechargeable cells. It will be appreciated that the invention is not limited to a particular type of battery or battery pack configuration and instead is useful for any type of rechargeable battery including, but not limited to, metal-air cells, lithium ion cells (e.g., lithium iron phosphate, lithium cobalt oxide, other lithium metal oxides, etc.), lithium ion polymer cells, nickel metal hydride cells, nickel cadmium cells, nickel hydrogen cells, nickel zinc cells, silver zinc cells, etc.

System controller 409 is used to monitor the output from system 407 and follow a preset course of action upon detection of a pressure anomaly. Controller 409 may be a stand-alone controller or integrated into another vehicle control system, for example a vehicle management system. In addition to a control processor, controller 409 may also include a memory 411 for storing a preset set of control instructions and/or recording event information. Memory 411 may be comprised of flash memory, a solid state disk drive, a hard disk drive, or any other memory type or combination of memory types.

Once the occurrence of a thermal runaway event has been detected and confirmed by the system of the invention, system controller 409 may perform any of a variety of responses in accordance with a preset set of response instructions. It will be appreciated that the system can be programmed to perform either single or multiple responses, and in the latter case the responses can be performed serially or in parallel. Exemplary responses include:

A warning indicator 413 may be coupled to system controller 409 that provides a visual or audible indicator, or both, of a detected battery thermal event. For example, in an electric vehicle indicator 413 may be an indicator light mounted in an instrument cluster on the dashboard and/or a graphic/symbol displayed on a vehicle interface and/or an audible alarm generated by a sound generator coupled to, or separate from, the vehicle's audio system.

System controller 409 may be coupled to means 415 for modifying the load on the battery pack once a thermal event has been detected and confirmed. By eliminating or at least reducing the load, the risk of event escalation, and more importantly the risk of the initial event propagating throughout the battery pack, can be reduced. Means 415 may also be used to achieve a controlled shut-down of the electric vehicle, thus minimizing the risks to the driver, passengers and/or service personnel that may have been summoned due to the malfunctioning cell(s). Typically means 415 is a control circuit used to control and couple the power from the battery pack to the various electric vehicle systems, i.e., motor, auxiliary systems, etc.

Upon detection of a thermal event, system controller 409 may be used to activate or alter the cooling output of a battery pack thermal management system 417, thus helping to reduce the temperature of the battery or batteries exhibiting increased temperature. By reducing battery pack temperature, the risk of event escalation as well as the risk of thermal runaway propagation throughout the battery pack can be reduced. Note that thermal management system 417 may be comprised solely of a cooling system or a combination of a cooling and a heating system (although only the cooling portion would be required in the event of cell failure). System 417 may be the thermal management system used to routinely control the temperature of the cells within the battery pack or, in at least one embodiment, system 417 may be an additional cooling system that is used in conjunction with the standard thermal management system. System 417 may be comprised of either a liquid or gas based cooling system.

An emergency fire extinguishing and/or containment system 419 may be coupled to system controller 409. It will be appreciated that when a battery undergoes thermal runaway, the temperatures are sufficient to cause the combustion of cell materials and/or materials in proximity to the affected cells. Accordingly the purpose of fire control system 419 is to contain the thermal event and prevent the event spreading to adjacent components/materials while insuring the safety of the vehicle's occupants and service personnel/first responders. Fire control system 419 may be either liquid or gas based.

In a battery pack containing a large number of cells, the system may be designed to continue operation even after one or more cells have ceased operation due to a thermal runaway event. Additionally, in at least one embodiment the system is configured to continue operation after detection of a first pressure anomaly while monitoring for a second pressure anomaly or the occurrence of a secondary effect that may be used to corroborate the occurrence of a thermal event. Accordingly, in at least one embodiment system controller 409 is designed to record the time and date of the cell failure, for example recording this information in memory 411. A record of cell failure events can later be used to determine potential battery failure mechanisms, for example by noting the demands being placed on the battery pack at the time of failure or the ambient temperature at the time of failure. Additionally, this information can be used to diagnose other, related issues with the electric vehicle. For example, the record of a cell failing in an electric vehicle's battery pack can be used to diagnose an exhibited loss of vehicle power, charging problems, etc.

In at least one embodiment, system controller 409 is coupled to an on-board communication system 421 that transmits a notification message regarding the occurrence of a thermal runaway event. The notification message may be sent to the vehicle's owner, or to a service provider (e.g., vehicle manufacturer), or both. The message may be transmitted via a communication network such as a cellular, internet, satellite or other network (not shown). This system allows the end user to be notified of a problem even if they are not in close proximity to the electric vehicle. This system can also be used to notify a pre-selected service company or emergency service provider (e.g., vehicle manufacturer) that a thermal event has been monitored that will require servicing.

Figure 5:
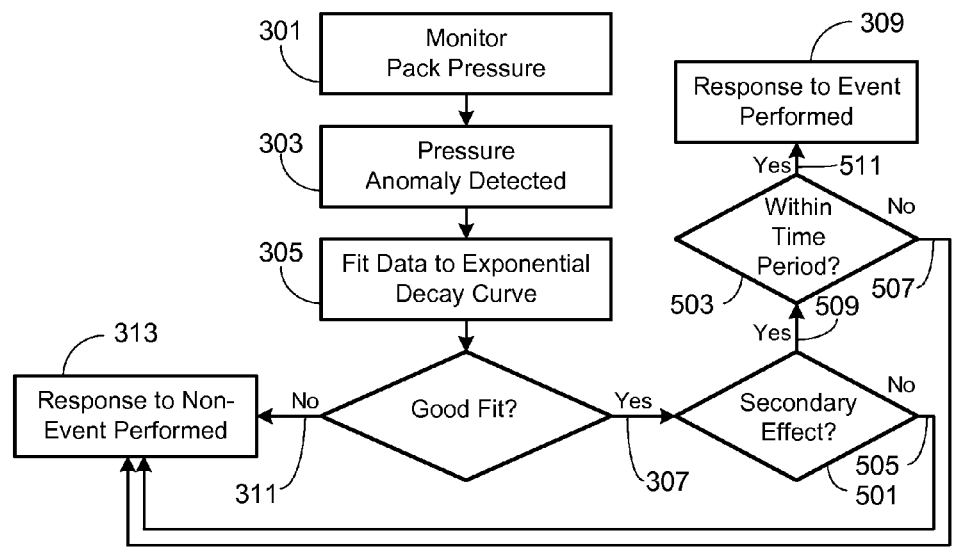
FIG. 5 illustrates a modification of the methodology shown in FIG. 3 in which the system uses secondary effects to corroborate the occurrence of a thermal event within the battery pack.
Figure 6:
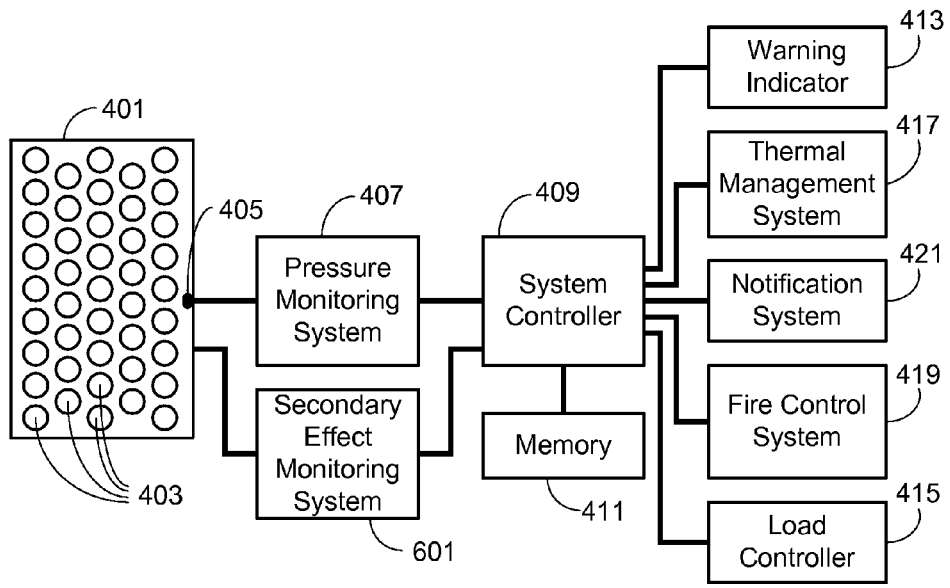
FIG. 6 illustrates a modification of the system shown in FIG. 4 in which the system uses secondary effects to corroborate the occurrence of a thermal event within the battery pack.

As noted above, one of the benefits of the present thermal event detection system is its ability to differentiate between actual thermal events and non-events that may still cause changes in the detected pressure readings (e.g., varying vehicle altitude, noise spikes, etc.). While there are a variety of techniques that may be used to increase detection confidence and minimize false positives based on a single detected pressure anomaly, in at least one embodiment of the invention, prior to initiating a response the system controller looks for event corroboration from a secondary effect. FIGS. 5 and 6 illustrate this aspect of the invention. As shown in FIG. 5, after it has been determined that there is a good fit between the data from a detected pressure anomaly and an exponential decay curve with an acceptable time constant (step 307), the system controller determines if there is any corroborating evidence of the detected event from a secondary effect monitoring system 601 (step 501). Typically the corroborating event must be detected within a preset time period from the pressure anomaly (step 503), for example within 10 minutes of the detected pressure anomaly, more preferably within 5 minutes of the detected pressure anomaly, and still more preferably at approximately the same time (plus/minus 1 minute) of the detected pressure anomaly. In this embodiment, if a secondary effect is not detected (step 505), or the secondary effect does not occur within the preset time period (step 507), the preset response to a non-event is performed (step 313). If a corroborating secondary effect is detected (step 509), and that secondary effect occurs within the preset time period (step 511), then the system controller performs the preset response (step 309).

System controller 409 may monitor any of a variety of battery pack characteristics in order to obtain corroborating evidence of a thermal event. In one of the simplest configurations, once a thermal event is detected via the pressure monitoring system 407, the system controller determines if a second pressure anomaly corresponding to a second thermal event is detected within a preset time period (e.g., 15 minutes). It will be appreciated that this approach tends to be more useful in identifying a propagating thermal event rather than simply corroborating the first event. Exemplary techniques that may be used by secondary effect monitoring system 601 to corroborate a detected thermal event based on a pressure anomaly include (i) a loss of voltage chain continuity, (ii) a spike in battery pack temperature, for example detected using one or more temperature sensors incorporated into the battery pack, (iii) a sudden increase in the relative humidity within the battery pack enclosure (i.e., the result of water vapor being generated as a cell combustion by-product), for example detected using one or more humidity sensors incorporated into the battery pack; (iv) a spike in the monitored temperature of the coolant used to cool the battery cells/pack, (v) an increase in battery pack temperature as determined by monitoring the transmission of light through an optical fiber incorporated into the battery pack (see, for example, co-assigned U.S. Pat. No. 8,092,081, incorporated herein), (vi) an increase in battery pack temperature as determined by monitoring the electrical continuity of a thermally interruptible electrical conductor incorporated into the battery pack (see, for example, co-assigned U.S. Pat. No. 8,059,007, incorporated herein), (vii) an increase in battery pack temperature as determined by monitoring the voltage of an insulated conductor incorporated into the battery pack (see, for example, co-pending U.S. patent application Ser. No. 12/455,248, incorporated herein), and/or other means. It will be appreciated that in order to minimize system complexity, weight and cost, preferably secondary effect monitoring system 601 utilizes sensors and systems that are already in place (e.g., battery cell/pack temperature sensors). As noted above, in order to increase event detection reliability, preferably the occurrence of an event detected using the pressure monitoring system 407 and an event detected using the secondary monitoring system 601 must occur within a preset time period of one another before system controller 409 registers a cell entering into thermal runaway. The preset time period may be on the order of 5 seconds, 30 seconds, 1 minute, 3 minutes, 5 minutes, 10 minutes, etc. However, as the goal of the present invention is to detect an early stage of cell failure, and preferably before a singular thermal runaway event may begin to propagate throughout the pack, preferably the preset time period is set to a relatively short time period (e.g., 3 minutes or less, and more preferably 1 minute or less).

As described above, by analyzing the pressure data taken from a battery pack, it is possible to distinguish pressure fluctuations that are due to the opening of the pressure relief vent of a cell within the pack from other effects, thus providing a reliable means of identifying the occurrence of thermal runaway events within the pack. More specifically, by analyzing a curve fit to the trailing edge of the pressure curve that results from a cell vent opening, it is possible to discriminate between various types of detected events, and in particular between thermal runaway events and signal noise or changing battery pack pressure that may result from other causes (e.g., varying altitude, temperature, etc.).

It will be appreciated that there are a variety of techniques that may be used to fit a curve to the set of pressure data taken using pressure monitoring system 407. Similarly, determining how close the fit of the curve is to the data (i.e., the goodness of fit) can also be accomplished using a variety of techniques. Therefore while several techniques are described herein, it should be understood that it is the ability of the current methodology and system to distinguish the shape of the pressure data resulting from a thermal runaway event from other monitored data that is unique, rather than a singular technique for fitting a curve to the monitored data.

Figure 7:
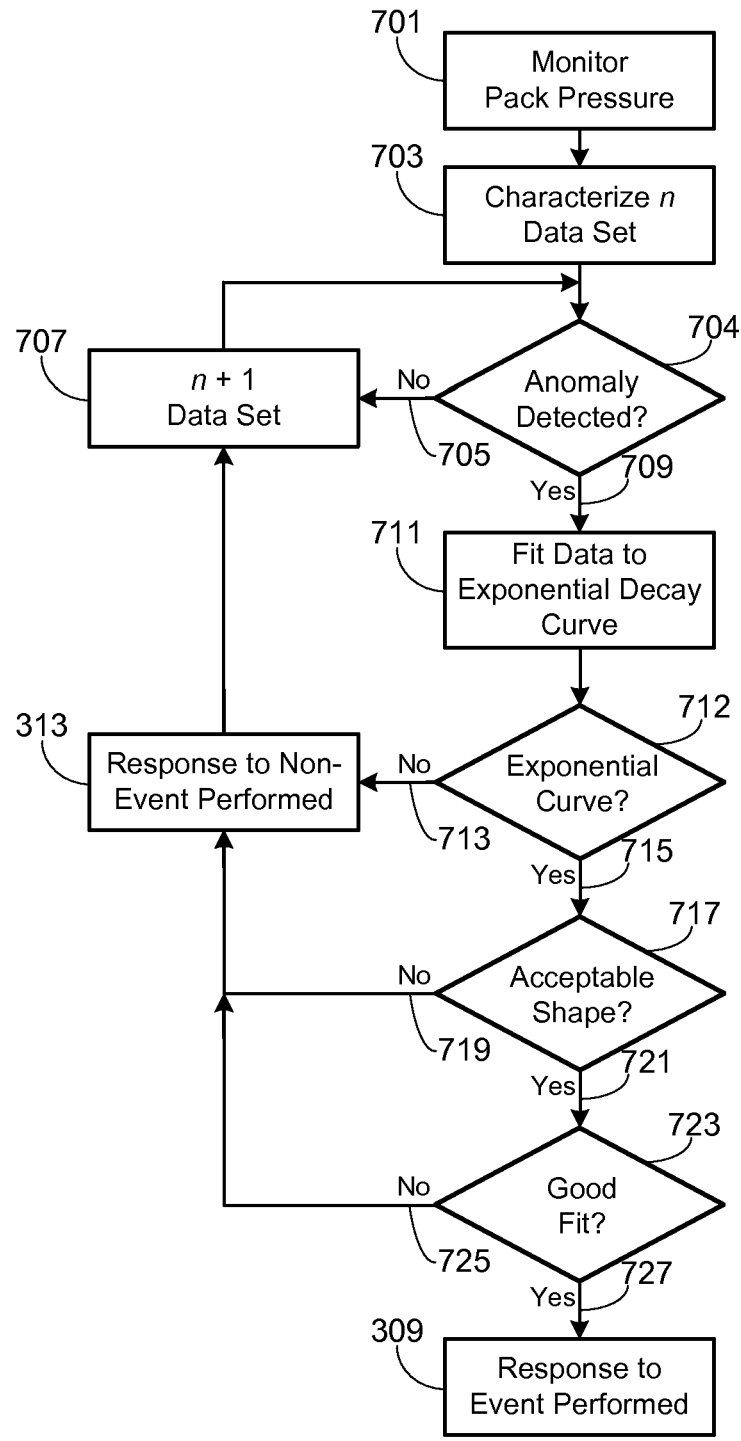
FIG. 7 provides additional details of the methodology of the invention in accordance with at least one embodiment.

FIG. 7 illustrates the basic methodology of the invention. The pressure within the battery pack is continuously monitored (step 701) using one or more pressure monitors 405 located within the battery pack and the pressure monitoring system 407. In order to accurately detect and characterize pressure variations within the battery pack, the sensitivity of the pressure monitoring system is typically set to a value smaller than 0.01 psi, and preferably equal to or less than 0.001 psi. It should be understood, however, that the pressure sensitivity as well as other pressure monitoring parameters (e.g., acquisition rate) that are required to accurately monitor the battery pack pressure are dependent upon characteristics of the battery pack (e.g., pack volume, pack pressure relief valve cracking value, leak rates of the pack, etc.) as well as characteristics of the cells (e.g., number of cells within the battery pack, size of the individual cells, chemistry of the cells, typical volume of gas released from the cells during thermal runaway, etc.). The preferred configuration of the invention is designed for a sealed battery pack housing at least 50 lithium-ion cells utilizing the 18650 form factor and in which the battery pack includes a pressure relief valve with a cracking value of 0.25 psi or greater. The acquisition rate (i.e., sampling frequency) of monitoring system 407 for this configuration was greater than 10 times the pressure decay time constant of the battery pack. Note that it is not necessary for the battery pack to include a pressure relief valve for the system of the invention to function correctly.

In step 703, a data set n of monitored pressure data is analyzed, the data set typically based on a time period (e.g., 100 seconds) or a predefined number of samples. If no pressure anomaly is detected within the data set (step 705), than the system moves to the next time period of data (i.e., n+1) for analysis (step 707). This process of continually monitoring the acquired pressure data continues until a pressure anomaly is detected within a data set (step 709). In at least one embodiment, the pressure anomaly is defined as a pressure peak that exhibits a pressure of at least 0.1 psi. At this point the data is fit to an exponential decay curve (step 711). If the data cannot be fit to an exponential decay curve (step 713), then system controller 409 performs the preset response to a non-event (step 313). As previously described, a typical response to a non-event is to simply ignore the event. Along with ignoring the event, system controller 409 may also record the non-event data in memory 411 as part of its preset response.

If the data associated with a pressure anomaly can be fit to an exponential decay curve (step 715), then the system determines if the exponential decay curve is of an acceptable shape (step 717), typically by determining if the time constant associated with the exponential decay curve is within an acceptable range of values. For example, in a preferred embodiment of the invention, the acceptable range of values for the time constant of the fitted exponential decay curve is between 8 and 13 seconds, and more preferably between 8.3 and 12.5 seconds. If the shape is not acceptable (step 719), then system controller 409 performs the preset non-event response (step 313) and continues to the next data set (step 707).

If the data associated with a pressure anomaly can be fit to an exponential decay curve with an acceptable time constant (step 721), system controller 409 may be programmed to immediately perform the preset response for a thermal event (step 309). In at least one preferred embodiment, however, prior to performing the preset response the system determines how well the pressure data fits the indicated exponential decay curve (step 723). This step is typically referred to as determining the goodness of fit between the acquired data and the curve. Various techniques can be used in step 723 to determine how well the data fits the exponential decay curve obtained in step 712. For example, the reduced chi-square value can be obtained and compared to an acceptable value. More preferably, an r-square value will be compared to the value of 1. Still more preferably, an adjusted r-square value may be used, thus taking into account the degrees of freedom. If the fit determined in step 723 is not acceptable (step 725), then system controller 409 performs the preset non-event response (step 313) and continues to the next data set (step 707). If the fit is acceptable (step 727), then system controller performs the preset response for a detected thermal event (step 309). While the system may immediately perform the preset response, in at least one embodiment and as previously noted, after detection of a pressure anomaly that meets the criteria for a thermal event (e.g., step 727), the system may also be configured to determine if there is a corroborating event prior to responding as described relative to FIGS. 5 and 6.

Figure 8:
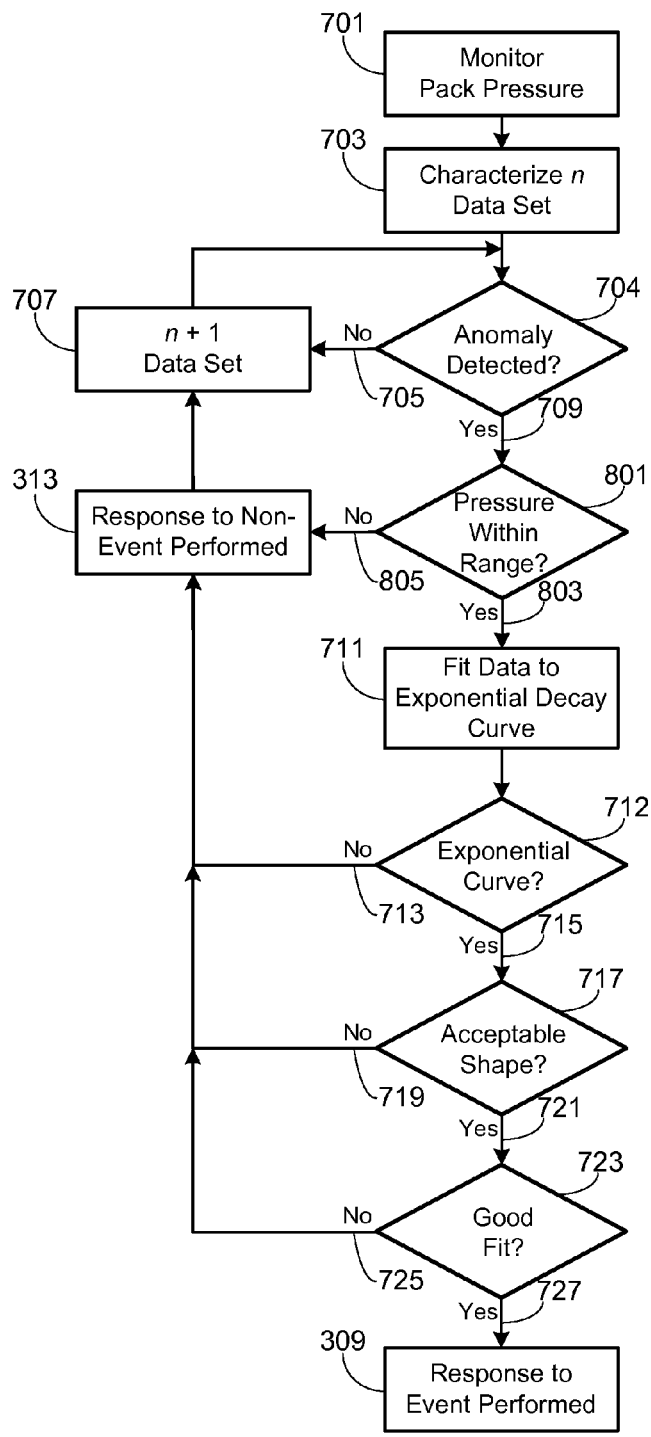
FIG. 8 provides additional details of the methodology of the invention in accordance with at least one embodiment.

As previously noted, there are many techniques that may be used to fit the data acquired by pressure monitoring system 407 to a curve as well as determine how well the data fits the curve. Accordingly, several techniques are disclosed herein that may be used to achieve these goals, either as a means of performing one or more of the steps shown in FIG. 7 or as an addition to these steps, thus improving false positive elimination. FIG. 8 illustrates one such modification of the methodology shown in FIG. 7. In this approach, once a pressure anomaly is detected (step 709), the system determines the magnitude of the pressure anomaly and compares it to a preset range (step 801), thus providing a means for rapidly distinguishing between an actual event and low pressure fluctuations (e.g., due to altitude variations) or pressure spikes (e.g., due to signal noise detected by the monitoring system). If the pressure corresponding to the detected anomaly is within the preset range (step 803), then the system continues to characterize the data as previously described. If the pressure corresponding to the detected anomaly is not within the preset range (step 805), then the system responds as preset for the detection of a non-event.

In at least one embodiment of the invention, data is analyzed in terms of 100 second intervals, although other interval sizes may be used with the invention. A variety of techniques may be used to determine if a pressure anomaly exists within each sample set, i.e., step 704. For example, the data within the sampling segment (i.e., the 100 second interval) may be averaged and compared to a preset pressure value or range of values. If the average of the sampled data exceeds the preset value/range, an anomaly is assumed (step 709). Alternately, all of the data within the sample may be compared to a preset pressure value or range of values, where an anomaly is assumed (step 709) if any of the data exceeds the preset value/range. Alternately, the data within the sample may be grouped into blocks of data, with the samples within each block being averaged and compared to a preset pressure value or range of values to determine whether or not the sampled interval contains an anomaly. Alternately, the peak within the sampled interval may be compared to the minimal value of the data within the sample set and if the difference between the two values exceeds a preset value, an anomaly is assumed.

Regardless of the technique used to identify an anomaly within the monitored pressure data, once an anomaly has been identified the next step is to remove the peak and the data around the peak from the data to be analyzed. This may be done, for example, by fitting the data surrounding the peak (i.e., ±1 second of data; ±2 seconds of data; ±4 seconds of data, etc.) to a line and removing the linear component from the data set. Then the trailing edge of the data, without the data associated with the peak, may be analyzed.

While various techniques may be used to fit the data associated with the identified anomaly to an exponential decay curve, in accordance with at least one embodiment of the invention the logarithm of the trailing edge of the pressure data is taken and the best fit line to this data is determined. Note that this line may also be referred to as the regression line or the least squares line. As the slope of this line corresponds to the decay time constant of the exponential decay curve, preferably the time constant is compared to an acceptable range of time constants in step 717, for example the acceptable range in the preferred embodiment is 8.3 to 12.5 seconds. Note that while it is possible to use this technique for the entire trailing edge of the data taken in the sample set, in at least one embodiment the data is divided into subsets. For example, for a 100 second sampling interval, the data may be divided into four 25 second sample sets.

In the above exemplary embodiments, all non-events were shown as being responded to in a similar manner, i.e., step 313. Similarly, all detected and confirmed thermal events were also shown as being responded to in the same way, i.e., step 309. It should be understood, however, that this is not a requirement of the invention and that the responses to both events and non-events may vary depending upon the particulars of the event/non-event. For example, the system controller can be programmed to respond to a non-event that can be characterized as noise (e.g., high frequency content) quite differently from a non-event that could be fit to an exponential decay curve but in which the time constant fell slightly outside of the acceptable range. Similarly, assuming that the configuration in question requires evidence of a corroborating event, the system controller may respond quite differently between a non-event characterized as noise and a non-event characterized as a thermal runaway event except that the event could not be corroborated by a secondary effect.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A method of detecting and responding to a battery thermal event within a sealed battery pack, the method comprising the steps of:
   continuously monitoring a pressure within said sealed battery pack and compiling said pressure into a plurality of sequential pressure data sets, wherein said step of continuously monitoring said pressure is performed at a first sample frequency;
   detecting a pressure anomaly within one of said plurality of sequential pressure data sets;
   identifying a pressure peak within said one of said plurality of sequential pressure data sets containing said pressure anomaly;
   fitting a curve to a trailing edge of said one of said plurality of sequential pressure data sets containing said pressure anomaly;
   determining if said curve corresponds to an exponential decay curve, wherein if said curve corresponds to said exponential decay curve said method further comprises the step of:
   determining if a time constant corresponding to said exponential decay curve is within a preset range of time constants, wherein if said time constant is within said preset range of time constants said method further comprises the step of:
   performing a predetermined battery thermal event response.

2. The method of claim 1, wherein said pressure peak corresponding to said pressure anomaly exhibits an amplitude of at least 0.1 psi.

3. The method of claim 1, further comprising the steps of setting a minimum time constant for said preset range of time constants to 8 seconds and setting a maximum time constant for said preset range of time constants to 13 seconds.

4. The method of claim 1, further comprising the steps of:
   determining a goodness of fit between said exponential decay curve and said pressure data corresponding to said trailing edge of said one of said plurality of sequential pressure data sets containing said pressure anomaly; and
   performing said predetermined battery thermal event response only if said curve corresponds to said exponential decay curve and said time constant corresponding to said exponential decay curve is within said preset range of time constants and a value corresponding to said goodness of fit is within a preset range of values.

5. The method of claim 1, wherein said step of identifying said pressure peak is performed prior to said step of detecting said pressure anomaly, wherein said step of detecting said pressure anomaly further comprises the step of determining if an amplitude corresponding to said pressure peak is greater than a nominal battery pack pressure by more than a preset value, wherein if said pressure peak is greater than said nominal battery pack pressure by more than said preset value then said method further comprises the steps of identifying said set of pressure data containing said pressure peak as said one of said plurality of sequential pressure data sets and said pressure peak as said pressure anomaly.

6. The method of claim 1, further comprising the step of monitoring for a secondary effect associated with said battery thermal event, wherein said predetermined battery thermal event response is performed if said curve corresponds to said exponential decay curve and if said time constant corresponding to said exponential decay curve is within said preset range of time constants and if said secondary effect is detected during said step of monitoring for said secondary effect.

7. The method of claim 6, wherein said step of monitoring for said secondary effect further comprises the step of monitoring for a loss of voltage chain continuity within said sealed battery pack.

8. The method of claim 6, wherein said step of monitoring for said secondary effect further comprises the step of monitoring a battery pack temperature, wherein said secondary effect corresponds to said battery pack temperature exceeding a preset temperature.

9. The method of claim 6, wherein said step of monitoring for said secondary effect further comprises the step of monitoring a battery pack humidity, wherein said secondary effect corresponds to said battery pack humidity exceeding a preset humidity.

10. The method of claim 6, wherein said step of monitoring for said secondary effect further comprises the step of monitoring a coolant temperature corresponding to battery pack cooling system, wherein said secondary effect corresponds to said coolant temperature exceeding a preset temperature.

11. The method of claim 1, wherein said step of performing said predetermined battery thermal event response further comprises the step of activating a visual warning indicator.

12. The method of claim 1, wherein said step of performing said predetermined battery thermal event response further comprises the step of activating an audible warning indicator.

13. The method of claim 1, wherein said step of performing said predetermined battery thermal event response further comprises the step of reducing an electrical load on a plurality of cells comprising said sealed battery pack.

14. The method of claim 1, wherein said step of performing said predetermined battery thermal event response further comprises the step of increasing cooling applied to said sealed battery pack by a battery pack cooling system.

15. The method of claim 1, wherein said step of performing said predetermined battery thermal event response further comprises the step of activating a fire containment system.

16. The method of claim 1, wherein said step of performing said predetermined battery thermal event response further comprises the step of recording date and time information corresponding to said pressure anomaly.

17. The method of claim 1, wherein said step of performing said predetermined battery thermal event response further comprises the step of transmitting a notification message via a communication and notification subsystem.

* * * * *